Aug. 19, 1952 R. F. MEYDRECH 2,607,402
POWER-ACTUATED AUTOMATIC SPOKE-TIGHTENING MACHINE
Filed Oct. 2, 1948 2 SHEETS—SHEET 2
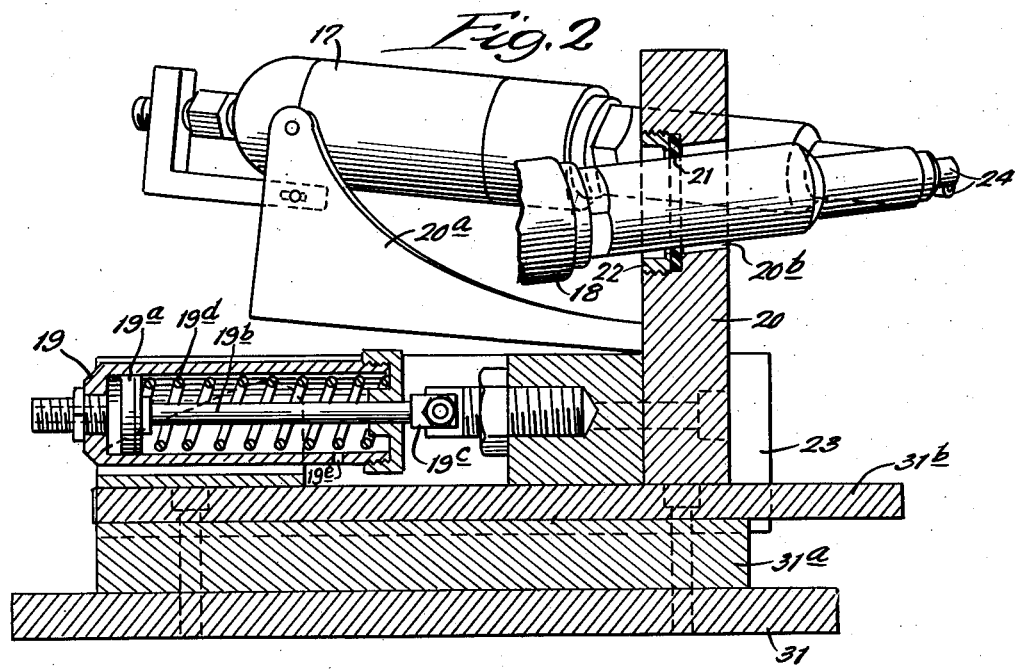
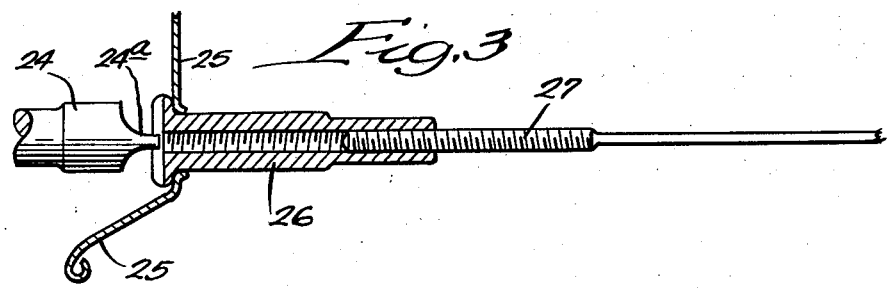
Inventor:
Raymond F. Meydrech,
By Dawson, Ooms, Booth and Spangenberg,
Attorneys.

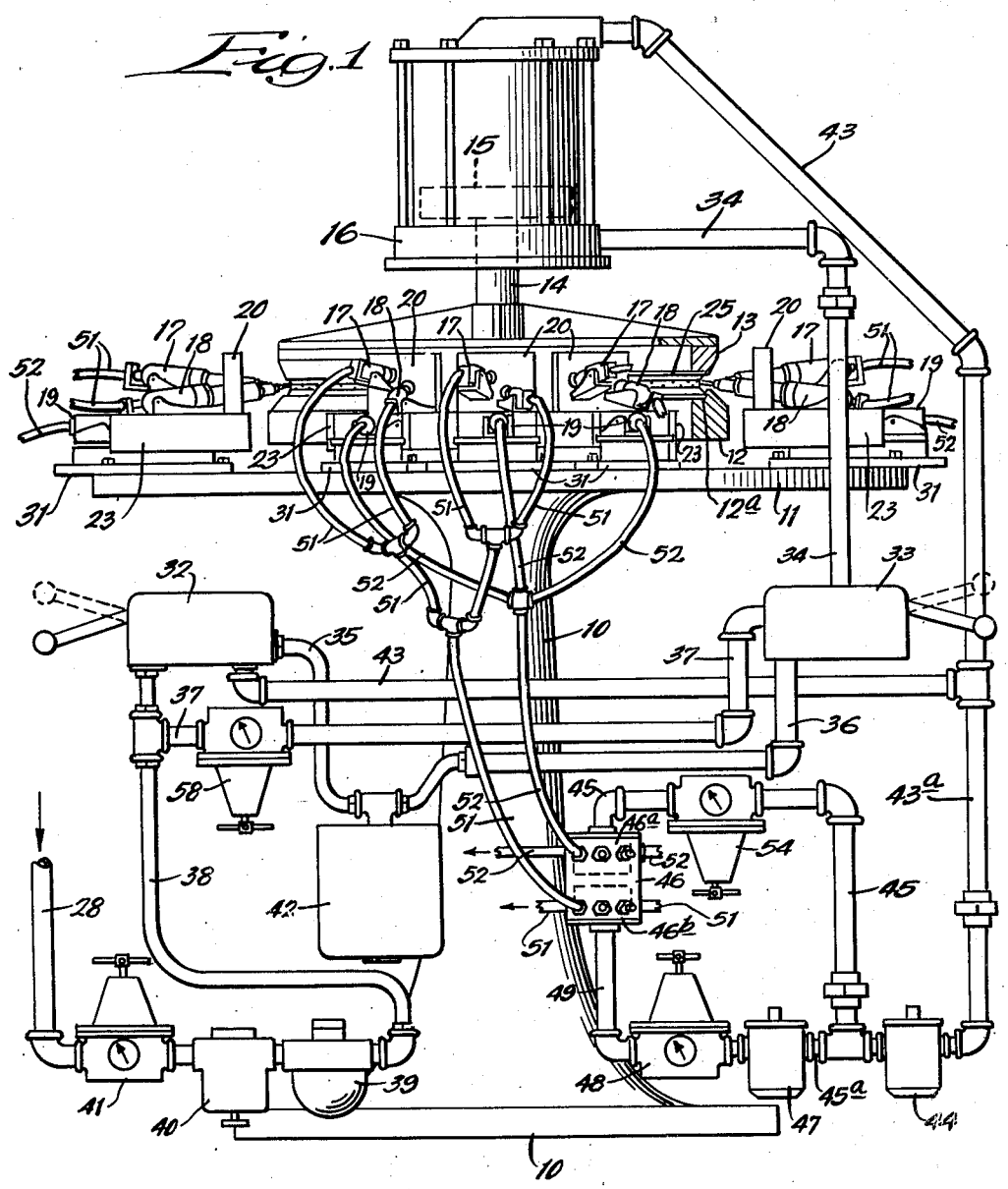

Patented Aug. 19, 1952

2,607,402

UNITED STATES PATENT OFFICE 2,607,402

POWER-ACTUATED AUTOMATIC SPOKE-TIGHTENING MACHINE

Raymond F. Meydrech, Riverside, Ill., assignor to Monark Silver King, Inc., Chicago, Ill., a corporation of Delaware Application October 2, 1948, Serial No. 52,506

3 Claims. (Cl. 157—1.5)

This invention relates to a machine for assembling wire-spoke wheels. In particular, it concerns an improved machine for aligning the rim and hub of a cycle wheel and tightening the wire spokes to the desired uniform tension while retaining said rim and hub in proper alignment.

An object of this invention is to provide an automatic machine adapted to receive a loosely assembled bicycle wheel comprising rim, hub, and spokes, and, in response to a single manual operation, to clamp the rim and hub and thereafter to tighten the spokes simultaneously to the tension desired.

Another object of this invention is to provide an automatic spoke-tightening machine in which the functions of clamping the rim and hub, advancing power drivers to engage the spoke nipples, and rotating the same to tighten the spokes are accomplished in proper time sequence responsively to a single manual control operation.

A further object of this invention is to provide an automatic spoke-tightening machine having a control system preventing operation of the clamping members until after both hands of the operator have been removed from the zone of danger.

Still another object of this invention is to provide, in a spoke-tightening machine, a driver bit of novel design and resilient driver mounting which, in combination, are particularly well adapted for automatic engagement with the spoke nipples.

Other objects and advantages of my invention will appear as the specification proceeds.

An illustrative embodiment of my invention is shown in the accompanying drawings, of which Figure 1 is a view in front elevation, partly broken away and partly in section, of a spoke-tightening machine made according to my invention. Fig. 2 is a fragmentary detail view, partly in section, of one of the power driver units employed in the machine of Fig. 1. Fig. 3 is a fragmentary detail view, partly in section, showing the novel structure of the driver bits in the Fig. 1 machine and the manner in which they cooperate with the rim and nipples to accomplish tightening of the spokes.

As shown in Fig. 1, my spoke-tightening machine is provided with a massive base or frame member 10, having at its upper end a flat table portion 11. Members 10 and 11 may be formed of steel or any other suitable material. A rim-and-hub clamping member 12 is securely affixed to table 11 at or near the center thereof; clamp member 12 is essentially circular in shape and has on its upper surface die-like recesses adapted respectively to receive in correct relative alignment a wheel rim and wheel hub. The die-like recess adapted to engage the rim is denoted 12a on the drawing and may be seen in the portion of the figure which is shown in section. The recess adapted to receive the wheel hub is concentric and co-axial with the rim-receiving recess, and is not visible in the drawing. Since such wheel-aligning clamp members are well known, however, it has not been considered necessary to show this member in detail.

Above table 11 a pneumatic power cylinder 16 is supported by any suitable means, as by bolting to an upward extension at the rear of frame 10. Power cylinder 16 contains a piston 15 carried on a piston rod 14. The lower end of piston rod 14 supports co-axially therewith a second clamp member 13 having rim and hub recesses on its lower surface corresponding to those on the upper surface of clamp member 12 and adapted to cooperate therewith to secure rigid retention and alignment of a rim and hub placed therebetween. A small finger or projection (not shown) is carried by clamp member 12 at one point along its circumference and is adapted to enter the valve-hole in the rim when the rim is placed on the clamp member. This projecting finger is for the purpose of insuring that the rim will always be placed on the clamp member in the position for proper registration with the spoke-tightening elements to be described in later paragraphs. Such a registration device is well known in the bicycle art.

A plurality of track members 31 are mounted on table 11 symmetrically and radially with respect to clamp member 12. Each of the members 31 has a flat upper surface 31b supported a short distance above table 11 by a reduced-width portion 31a. A carriage member 20 is associated with each of the track members 31; it is adapted to slide back and forth in the radial direction along top surface 31b, and it is held in its radial path by the side plates 23 carried by carriage member 20. Side plates 23 have, along their inner sides, a horizontal groove adapted to ride on the flanges formed by the edges of plate 31b as they overlap the reduced-width supporting pedestal 31a.

Securely bolted to the rear portion of each of the track members 31 is a pneumatic power cylinder 19, having a piston 19a, a piston rod 19b, and a loading spring 19d. Cylinder 19 is oriented with respect to track member 31 so that piston rod 19b is parallel to the plane of table 11 and in the same radial line occupied by the axis of track member 31. At its forward end piston rod 19b is connected, by a yoke coupling 19c, to carriage member 20. Loading spring 19d normally urges piston 19a backward against the rear wall of cylinder 19, so that carriage member 20 is normally in a position substantially retracted from the clamping member 12. An air vent 19e is provided in the wall of cylinder 19 near its forward end.

Each of the carriage members 20 carries a pair of pneumatically-driven power screw drivers denoted 17 and 18 respectively. A pair of brackets 20a, rigidly affixed at their forward ends to carriage member 20, extend rearwardly from member 20, and the power drivers 17 and 18 are respectively pivoted thereto. The forward ends of the power drivers 17 and 18 extend beyond carriage members 20; the drivers pass through oversize apertures 20b in carriage member 20, and are secured within such apertures by a resilient washer 21, which may be made of neoprene or other suitable material. Washer 21 is proportioned to fit snugly over the barrel of the power driver which it supports, and it is held securely in place within aperture 20b by a packing gland 22 which is threaded into aperture 20b, as shown in Fig. 2.

The total number of track members 31 provided around the periphery of clamp member 12, and hence the total number of retractable carriage members 20, should preferably be half as great as the total number of spokes on the wheel to be constructed. Since each carriage 20 supports two power drivers, the machine thus provides a power driver for each spoke nipple, so that all of the spokes on the wheel can be tightened to proper tension simultaneously.

At their forward ends drivers 17 and 18 carry bits 24 which have screw driver tips 24a adapted to engage the grooved heads of the spoke nipples. Screw driver tip 24a is formed eccentrically with respect to the axis of bit 24, as shown in Fig. 3, the reason for which will appear later. Fig. 3 illustrates the manner in which tip 24a engages spoke nipple 26. As will be seen from Fig. 3, the outer end of spoke 27 is provided with external threads which cooperate with corresponding internal threads on the nipple 26.

The power-driven screw drivers 17 and 18 are equipped with pneumatic motors which develop a maximum torque which is a function of the pressure of the compressed gas supplied. If the torque required to rotate the load coupled to such a motor is greater than it can develop at the air pressure being supplied to it, the motor simply stalls and ceases to take energy from the pressure source. Such screw drivers are well known, and since my invention does not reside in the driver structure per se, no detailed description of them is considered necessary.

It will be understood that the brackets 20a on the various carriage members 20 are proportioned and oriented to bring the various screw driver bits 24a substantially into engagement with the respective spoke nipples 26 when the carriage members 20 are advanced toward the rim 25 held between clamp members 12 and 13.

The pipe 28 may be connected to any suitable source of pneumatic pressure; it runs to a pressure-regulating valve 41, which is in turn connected to a filter 40 and a lubricator unit 39. From lubricator 39 the compressed air is carried by conduit 38 to the input port of manual valve 32. A branch conduit 37, containing pressure-regulating valve 58, connects conduit 38 to the input port of manual valve 33, which may be positioned in front of table 11 on the opposite side of frame 10 from manual valve 32. A second port on valve 32 is connected by conduit 43 to a port at the upper end of pneumatic power cylinder 16. A third port on valve 32 is connected by conduit 35 to a muffler element 42. Muffler 42 is a vent to atmosphere, and it merely affords quieter operation than would be obtained with an open vent.

A second port on valve 33 is connected by conduit 34 to a port at the lower end of pneumatic power cylinder 16, and a third port on valve 33 is connected by conduit 36 to muffler 42.

Valves 32 and 33 are spring-loaded manual valves of the type commonly known as "three-way" valves. The conduit connections to valve 32 are chosen such that when the valve is in its normal position conduit 43 is connected to conduit 35 and hence through muffler 42 to atmosphere. When the handle of valve 32 is manually depressed, conduit 43 is connected with conduit 38.

The conduit connections to valve 33 are so chosen that when valve 33 is in its normal position conduit 37 is connected with conduit 34, and when the handle of valve 33 is manually depressed, conduit 34 is connected to conduit 36 and thence to atmosphere through muffler 42. Fig. 1 shows valves 32 and 33 in their manually-actuated or depressed positions. The dotted lines indicate the positions normally occupied by the handles when they are not being manually actuated.

A branch conduit 43a connects conduit 43 to a delayed-action valve 44. Valve 44 may be of the oil dash-pot type or of any other suitable design such that when pressure is applied to it it remains closed for a predetermined time interval and then opens. From time-delay valve 44, conduit 45 runs to chamber 46a of a dual distributing manifold 46. Pressure-regulating valve 54 is located in line 45.

A second time-delay valve 47, similar in structure to valve 44, is connected to conduit 45 by branch line 45a. Conduit 49, containing pressure-regulating valve 48, connects valve 47 to chamber 46b in manifold 46.

From chamber 46a in manifold 46, a plurality of flexible conduits 52 extend to the various power cylinders 19; to avoid confusion on the drawing, only one of these flexible conduits 52 is shown.

Similarly, from chamber 46b in manifold 46, a plurality of flexible conduits 51 connect to the power drivers 17 and 18. As with flexible conduits 52, only one of the conduits 51 is fully shown in the drawing.

In Fig. 1, in order that the structure of the machine and its principles of operation might be shown clearly, only a portion of the carriage members 20 and their associated power drivers have been illustrated.

As hereinbefore stated, it is preferable that a power driver be provided for each spoke on the wheel to be constructed.

It will be understood that the filter, the lubricator unit, and the various pressure-regulating valves shown and described in the pneumatic system of this embodiment of my invention are useful refinements which assist in efficient, trouble-free operation. If desired, however, any or all of these elements may be dispensed with. Likewise, if desired, muffler 42 may be replaced by an open atmosphere vent.

Operation

Unless both valves 32 and 33 are being manually depressed, piston 15 in power cylinder 16 will be at its upper position, at which clamp member 13 is retracted from its cooperating clamp member 12. This results from the fact that in the normal position of valve 33 gas under high pressure is admitted through conduits 37 and 34 to the under side of piston 15, while valve 32 in its normal position places the upper side of piston 15 at atmospheric pressure. If valve 32 alone is manually actuated pneumatic pressure is imposed on the top of piston 15, but the piston is not lowered because an equal pressure remains on its under side by reason of the high pressure transmitted through valve 33 and line 34. If valve 33 alone is actuated, the under side of piston 15 is vented to atmosphere, but the piston does not move, since the pressure above piston 15 is also atmospheric. The friction caused by the tight packing between piston 15 and the inner wall of cylinder 16 effectually prevents gravity alone from pulling clamp member 13 downward.

In operating my invention, the operator will normally receive a wheel comprising a hub, a rim, and the wire spokes associated therewith. In a previous construction step, these elements will have been loosely assembled by passing nipples through the apertures provided therefore in the rim and starting them into loosely threaded engagement with the spokes. The operator places the loosely-assembled wheel onto clamping member 12, inserting into the valve hole of the rim the projection heretofore mentioned in order to insure proper registration between the spoke nipples and the screw driver tips of the power drivers.

When the rim and hub are properly in place on clamp member 12, the operator actuates valves 32 and 33 simultaneously, using one hand for each valve handle. This insures that both of his hands will be out of the vicinity of clamps 12 and 13 before they are brought together under pressure.

When valves 32 and 33 are simultaneously actuated, the lower side of piston 15 is placed at atmospheric pressure, and highly compressed air is applied to the upper side of piston 15. As a result, clamp member 13 is lowered by the dropping piston 15 to clamp firmly in proper alignment the rim and hub of the wheel under construction. When the valves 32 and 33 are first actuated by the operator, no movement occurs with respect to carriage members 20 or power drivers 17 and 18, since time-delay valve 44 blocks passage of compressed air beyond it. It will be recalled that, due to loading springs 19d, carriage members 20 are normally in retracted position.

After the critical time interval, which in practice may be a few seconds in order to permit proper seating of clamp member 13, valve 44 opens and air under pressure is admitted to the power cylinders 19 on track members 31. Thereupon pistons 19a advance, carrying with them carriage members 20, thus bringing the screw driver tips 24a into abutment with the spoke nipples 26.

As the air is applied to the power cylinders 19, it is simultaneously applied to the second delayed-action valve 47, and after a second time interval, which again may be a few seconds, valve 47 opens and admits air to the pneumatic motors in power drivers 17 and 18. This causes the bits 24a to begin rotation, and by reason of the eccentric design of bits 24a, they sweep through a relatively wide area and thus "explore" the heads of the spoke nipples 26 until the bits 24a fall into engagement with the head grooves in the nipples. The neoprene resilient bushings 21, coupled with the relatively loose pivot supports by which the power drivers are held to brackets 20a, give to the power drivers sufficient freedom of radial movement to enable the driver bits 24a to center themselves in the respective spoke nipples after they have worked into engagement with the head grooves. Rotation of the spoke nipples will normally be accompanied by some degree of sliding of the driver head within the nipple slot. The three degrees of freedom thus afforded—the resilient bushing, the loose pivot supports, and the slidable engagement between the driver and the nipple slot—permit the drivers to tighten the nipples quickly and smoothly. The spoke nipples are threaded tightly onto the spokes by the power drivers, and when the tension on any given spoke reaches the critical point at which the pneumatic motor for that particular power driver stalls, the motor stops, and the bit ceases to turn. Adjustment of this critical stalling tension may be accomplished by varying the setting of pressure-regulating valve 48.

When the spokes have all been tightened to the proper tension, all the screw drivers will have ceased to rotate. When the operator sees that rotation of the screw driver bits 24a has ceased on all the power drivers, he releases the handles of valves 32 and 33. Thereupon, the screw drivers are retracted by the action of loading springs 19d, and the upper clamp member 13 is raised by power cylinder 16. The release of the valve handles by the operator causes high pressure to be applied on the lower side of piston 15 at the same time that the upper side of piston 15 is vented to atmosphere.

It will be seen from the foregoing description of the operation of my invention that by its use an operator can clamp a wheel into alignment and tighten all the spokes thereof to the desired tension by the single manual operation of depressing the handles of the manual valves 32 and 33. The timing of the screw driver operations is accomplished automatically, and the novel design of the screw driver supports and the eccentric bit structure provide in combination a very effective and speedy means of insuring proper engagement between the driver bits and the nipples.

While I have in this specification described one embodiment of my invention in considerable detail for purposes of illustration, it will be understood that many modifications and variations thereon may be made by persons skilled in the are without departing from the spirit of my invention.

I claim:

1. In a spoke-tightening machine for wheels having a hub, a rim, a plurality of wire spokes connecting the hub and rim, and a nipple for each spoke for holding the same under tension to the rim, the combination of a frame adapted to support the rim and hub, retractable clamping means adapted when advanced to secure the rim and hub in proper alignment against the frame, a plurality of retractable drivers each positioned to engage a spoke nipple when advanced toward the rim, said drivers having screw driver bits formed eccentrically with respect to the axis of rotation thereof, carriage means for the drivers adapted to carry them between their advanced and retracted positions, said carriage means comprising resilient mountings for said screw drivers adapted to permit said drivers a limited range of radial movement, a manually actuable control means operative on actuation to advance the clamping means to engage the rim and hub, and time-delay means operative automatically on actuation of the control means to advance the drivers and to rotate the screw driver bits to engage the nipples and tighten the spokes at predetermined intervals of time after the actuation of the control means.

2. In a spoke-tightening machine for wheels having a hub, a rim, a plurality of wire spokes connecting the hub and rim, and a nipple for each spoke for holding the same under tension to the rim, the combination of a frame adapted to support the rim and hub, retractable clamping means adapted when advanced to secure the rim and hub in alignment against the frame, a fluid-pressure power cylinder for advancing and retracting the clamping means, a plurality of power-driven screw drivers having bits formed eccentrically with respect to their axis of rotation, retractable carriage means comprising resilient mountings for said screw drivers adapted to permit said drivers a limited range of radial movement, said carriage means being adapted when advanced to bring each screw driver into abutment with a spoke nipple, fluid-pressure power cylinders for advancement and retraction of the carriage means, a manually actuable control means operative on actuation to supply fluid under pressure to said first-mentioned power cylinder to advance the clamping means, and time-delay means operative automatically on actuation of the control means to supply fluid under pressure to said last-mentioned power cylinders for advancing the carriage means and to rotate the screw drivers at predetermined times after the actuation of the control means.

3. In a spoke-tightening machine for wire-spoke wheels comprising a power-driven screw driver adapted to engage a spoke nipple and rotate the same for tightening a spoke, the combination of a bit for the screw driver formed eccentrically with respect to its axis of rotation and a resilient mounting for the screw driver operative to hold the screw driver substantially in desired position while allowing it a limited range of radial movement.

RAYMOND F. MEYDRECH.

REFERENCES CITED

The following references are of record in the file of this patent:

UNITED STATES PATENTS

| Number | Name | Date |
| --- | --- | --- |
| 569,888 | Sanderson | Oct. 20, 1896 |
| 1,774,030 | McLaughlin | Aug. 26, 1930 |
| 1,856,169 | Rosener et al. | May 3, 1932 |
| 1,944,596 | Farr | Jan. 23, 1934 |
| 1,980,129 | Eksergian | Nov. 6, 1934 |
| 1,994,974 | Wiedmann | Mar. 19, 1935 |
| 2,050,619 | Malott | Aug. 11, 1936 |
| 2,301,028 | Esch | Nov. 3, 1942 |
| 2,422,593 | Smith | June 17, 1947 |
| 2,533,113 | Henry | Dec. 5, 1950 |